ABSTRACT# United States Patent [19]

Zweigle et al.

[11] 4,357,168
[45] * Nov. 2, 1982

[54] CELLULOSIC COMPOSITIONS USEFUL IN PREPARING HOT MELTS

[75] Inventors: Maurice L. Zweigle, Midland; Janet C. Hickman, Rhodes, both of Mich.

[73] Assignee: The Dow Chemical Co., Midland, Mich.

[*] Notice: The portion of the term of this patent subsequent to Mar. 17, 1998, has been disclaimed.

[21] Appl. No.: 239,728

[22] Filed: Mar. 2, 1981

Related U.S. Application Data

[63] Continuation-in-part of Ser. No. 28,775, Apr. 10, 1979, Pat. No. 4,256,505, which is a continuation-in-part of Ser. No. 926,488, Jul. 20, 1978, abandoned.

[51] Int. Cl.$^3$ .............................. C08L 1/10; C08L 1/26
[52] U.S. Cl. ..................................... 106/171; 106/177; 106/180
[58] Field of Search ....................... 106/177, 180, 171; 260/45.7 PH

[56] References Cited

U.S. PATENT DOCUMENTS

| | | | |
|---|---|---|---|
| 2,517,754 | 8/1950 | Young | 426/125 |
| 2,840,474 | 6/1958 | Wirt et al. | 426/125 |
| 2,840,476 | 6/1958 | Wirt et al. | 106/191 |
| 2,868,656 | 1/1959 | Pattern et al. | 426/125 |
| 2,951,763 | 9/1960 | Kelly et al. | 426/125 |
| 2,962,382 | 11/1960 | Ives | 426/125 |
| 3,535,277 | 10/1970 | Miller et al. | 260/45.7 PH |
| 3,577,372 | 5/1971 | Flanagan et al. | 260/45.7 PH |
| 4,256,505 | 3/1981 | Zweigle | 106/180 |

Primary Examiner—Theodore Morris

[57] ABSTRACT

A cellulosic composition of a cellulosic such as ethyl cellulose, a surfactant such as polyoxyethylene sorbitan monolaurate and a heat stabilizer such as triaryl phosphite can be mixed with an oil extender to form a hot melt composition which does not discolor upon extended heating at elevated temperatures.

21 Claims, No Drawings

CELLULOSIC COMPOSITIONS USEFUL IN PREPARING HOT MELTS

CROSS-REFERENCE TO RELATED APPLICATION

This application is a continuation-in-part of our copending application Ser. No. 028,775, filed Apr. 10, 1979, which now U.S. Pat. No. 4,256,505 is a continuation-in-part of application Ser. No. 926,488, filed July 20, 1978, now abandoned.

BACKGROUND OF THE INVENTION

This invention relates to cellulosic compositions, particularly to compositions of a cellulosic, a surfactant and a heat stabilizer and to the hot melt compositions prepared therefrom.

Due to their physical properties such as coating capability, strength, thermal stability and ease of removal; hot melt compositions of ethyl cellulose and an oil extender are widely used as temporary protective coatings for various articles such as tools, machinery and the like.

In a typical operation, a coating formulator prepares the hot melt compositions by mixing an ethyl cellulose, an oil extender (generally a mineral oil) and other adjuncts, e.g., plasticizers and heat stabilizers, with constant agitation and heat until a solution occurs. The resulting solution is solidified by cooling to ambient temperatures, i.e., 20°–30° C. During this solidification, the mixture is formed into blocks or other convenient shapes for shipment and subsequent storage.

In the coating operation, the solid blocks of the hot melt composition are reheated to a molten form, with temperatures from 125° to 190° C. conventionally being employed. The part to be coated is dipped in the molten composition for a short period, e.g., 1–5 seconds, then withdrawn and excess material drained therefrom. The composition solidifies on the part upon cooling, forming the temporary protective coating.

Unfortunately, the oil extender in the composition often tends to exude excessively from the composition in its solidified form. Such oil exudation causes handling and packaging problems and creates a fire and safety hazard in storage facilities. Moreover, the exuded oil is not generally recoverable, thereby necessitating the replacement of the lost material. In addition, the compatibility of the hot melt components, i.e., ethyl cellulose, oil extender and other adjuncts, is often poor in the solidified composition, as evidenced by the crazing, swirling and the like therein.

Heretofore, oil exudation has been decreased by reducing the concentration of the oil in the hot melt composition. See, for example, U.S. Pat. Nos. 2,517,754 and 2,951,763. Unfortunately, such practice is economically undesirable.

In view of these stated deficiencies, it is highly desirable to furnish a hot melt coating composition containing a cellulosic and substantial amounts of an oil extender which composition exhibits reduced oil exudation and improved compatibility.

SUMMARY OF THE INVENTION

Accordingly, one aspect of the present invention is a cellulosic composition comprising a cellulose ester or a cellulose ether, a surfactant and a heat stabilizer wherein the heat stabilizer is employed in an amount sufficient to reduce the discoloration exhibited by a hot melt composition formed upon the admixture of the cellulosic composition and an oil extender.

In a second aspect, the present invention is a hot melt composition comprising a cellulose ether or cellulose ester, an oil extender, a surfactant and a heat stabilizer.

The novel cellulosic compositions of this invention are unique in that the hot melt compositions prepared therefrom exhibit less oil exudation and/or improved compatibility than hot melt compositions containing no surfactant. In addition, the thermal and color stability of the hot melt compositions are such that they do not discolor on extended heating at elevated temperatures.

The compositions of this invention are useful in coating applications, particularly for temporary protective coatings for many articles such as machinery, tools and the like.

DETAILED DESCRIPTION OF PREFERRED EMBODIMENTS

For the purposes of this invention, a hot melt composition comprises a mixture of an oil extender and a cellulosic which mixture (1) forms a liquid solution when heated to a temperature less than about 225° C., and (2) after forming said solution, upon cooling to ambient temperatures, e.g., 20°–30° C., solidifies to a monolithic type semi-solid or gel-like material. When this material is reheated to a temperature of at least about 90° C., it reforms to a liquid solution, i.e., melts. By the term "liquid solution" it is meant that the mixture of the cellulosic and oil extender appears as a uniformly dispersed or homogeneous liquid under visual inspection with no magnification. Generally, in such solution, individual molecules and/or colloidal size particles of the cellulosic are uniformly dispersed in the oil. When said mixture of the cellulosic and oil extender is a liquid solution, the hot melt composition is hereinafter referred to as a "molten composition." When said mixture is solidified, the hot melt composition is hereinafter referred to as a "solidified composition."

Cellulosics and oil extenders suitably employed in the practice of this invention include those cellulose or cellulose derivatives and oil extenders which in the presence of a compatibilizing amount of a surfactant form a hot melt composition.

As used herein, the term "oil extender" refers to any normally liquid material which is not miscible with water and which is at least partially soluble in ethyl ether at ambient temperatures. Representative examples of oil extenders useful in the practice of this invention include mineral oils such as aliphatic or wax base, aromatic or asphalt based, and mixed base petroleum oils; petroleum derived oils such as paraffinic or lubricating oils; vegetable oils such as linseed, tung, soybean, cottonseed, castor, coconut and palm oils; animal oils such as fish and sperm oil; mixed glycerides and the like, or mixtures thereof. Of these oil extenders, the mineral oils and vegetable oils are preferred, with a mineral oil of the paraffinic variety or derived from a naphthenic petroleum source and mixtures thereof being especially preferred.

Representative examples of cellulosics useful herein include ethyl cellulose, cellulose acetate butyrate, cellulose nitrate, cellulose acetate propionate, cellulose acetate, ethyl hydroxyethyl cellulose and the like. Preferred cellulosics include ethyl cellulose and cellulose acetate butyrate. Most preferred is ethyl cellulose having an ethoxy content in the range from about 45 to about 51 percent, preferably from about 49 to about 49.5 percent, by weight, and a viscosity of less than about 150 cps, preferably from about 40 to about 100 cps. Said viscosity is the viscosity of a 5 weight percent solution of the ethyl cellulose in an 80/20 by volume toluene/ethanol mixture as measured by a Ubbelhode viscometer (1.1 mm inside diameter) at 25° C.

Advantageously, the hot melt compositions of this invention comprise from about 10 to about 50 weight percent, preferably from about 20 to about 40 weight percent of the cellulosic, and from about 90 to about 50 weight percent, preferably from about 80 to about 60 weight percent, of the oil extender, wherein the weight percent is based on the total weight of the cellulosic and oil extender.

For the purposes of this invention, the term "surfactant" is intended to mean any surface active agent which reduces surface tension when dissolved in water or an aqueous solution or which reduces interfacial tension between two liquids or between a liquid and a solid. Included within said term are those compounds conventionally called detergents, wetting agents and emulsifiers. Illustrative examples of such surfactants are those presented in *McCutcheon's Detergents and Emulsifiers* edited by J. W. McCutcheon, published in 1976 by John W. McCutcheon, Inc., Morristown, N.J.

Surfactants suitably employed in the practice of this invention are those surface active agents which when employed in a compatibilizing amount (1) measurably reduce the oil exudation from a solidified composition, and/or (2) visually increase the compatibility of the components in said composition. Advantageously, such compatibilizing amount of surfactant does not deleteriously effect the other properties of said solidified composition, i.e., does not significantly reduce thermal stability or strength properties of coatings made therefrom. By "measurably reduce the oil exudation" it is meant that the oil exudation is reduced by a measurable amount using conventional test methods, e.g., Footnote 2 of Table I in Example 1. Preferably, such compatibilizing amount of surfactant reduces oil exudation by at least 20 weight percent, more preferably by at least about 50 weight percent, when compared with an identical solidified composition containing no surfactant. By way of example, a solidified composition exhibiting an initial oil exudation of 3 weight percent exhibits at least 20 weight percent less oil exudation when the oil exudation after addition of surfactant is less than or equal to 2.4 weight percent, said weight percents being based on the weight of the total mixture.

In general, incompatibility of the components in the solidified composition is evidenced by the formation of two phases; typically, an oil rich phase and cellulose rich phase. In a normal operation, the cellulose rich phase appears as crazing, swirling, void formation and the like within the solidified composition. By "visually increase the compatibility of the components in the solidified composition," it is meant that such separation, in a block of the solidified composition having dimensions of at least 5 cm on a side, is visibly reduced throughout the block as evidenced by reduced crazing, swirling and void formation.

Advantageously, the surfactants employed in this invention are weak (i.e., only partially ionizable) anionic or cationic, nonionic and amphoteric surfactants having an HLB value of at least about 6 (wherein HLB is hydrophilic-lipophilic balance of the surfactant) and which are soluble in the mixture of the cellulosic and oil extender. By the term "soluble" it is meant that the surfactant forms a liquid solution, i.e., appears as a uniformly dispersed or homogeneous liquid under visual inspection with no magnification, with said mixture at some temperature less than about 225° C. Representative examples of such soluble nonionic surfactants useful in the practice of this invention include the polyoxyethylene derivatives of fatty acid partial esters of sorbitol anhydrides, e.g., poly(oxyethylene)$_{20}$ sorbitan monolaurate and poly(oxyethylene)$_4$ sorbitan monostearate; the ethoxylated sorbitan esters, e.g., sorbitan monooleate; alkylphenoxypoly(oxyethylene)ethanols, e.g., nonylphenoxypoly(ethyleneoxy)ethanol; and the polyoxyalkylene derivatives of propylene glycol. Representative of such amphoteric surfactants is the sodium salt derivative of dicarboxylic caprylic acid sold as Miranol® J2M by the Miranol Chemical Co., Inc. Weak anionic surfactants useful herein include the metal salt of a long chain (i.e., six or more carbon atoms) carboxylic acid, advantageously, the alkali metal salt of such carboxylic acid, i.e.,

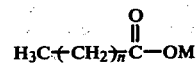

wherein n is preferably an integer of at least 6, more preferably n is an integer of at least about 8 and less than about 200, and M is an alkali metal salt, preferably sodium, such as the sodium salt of stearic acid (i.e., sodium stearate). A representative example of a weak cationic surfactant is polypropoxylated quaternary ammonium chloride. Preferred surfactants are nonionic and weak anionic surfactants; with polyoxyethylene (20) sorbitan monolaurate; polyoxyethylene (20) sorbitan monostearate; nonylphenoxypoly(ethyleneoxy)ethanol; the polyoxyalkylene derivatives of propylene glycol and the alkali metal salt of long chain carboxylic acids, particularly sodium stearate, being especially preferred.

Amounts of such surfactants required to give the compatibilizing effect hereinbefore defined will vary depending on the surfactant employed and the type and relative concentration of the cellulosic and oil extender. Typically, the surfactant is employed at a concentration of at least 0.1 weight percent. Advantageously, it is employed at a concentration from about 0.2 to about 35 weight percent, preferably from about 0.2 to about 15 weight percent, more preferably from about 0.5 to about 5 weight percent, most preferably from about 0.5 to about 2 weight percent based on the total weight of the cellulosic and oil extender. Generally, to reduce the possibility of excessive degradation of the hot melt adhesive, the weak cationic and anionic surfactants are more advantageously employed at the lower percentages, i.e., from about 0.1 to about 5, preferably from about 0.2 to about 4, weight percent based on the weight of the cellulosic and oil extender.

The hot melt compositions of this invention can also comprise various additional ingredients such as plasticizers, stabilizers, and the like. The adjuncts employed and their amounts are dependent on the end use application of the hot melt composition. Conventionally, hot melt compositions contain a heat stabilizer. The term "heat stabilizer" is well known and used herein to mean a compound which is capable of stabilizing the hot melt composition at elevated temperatures over extended time periods. Representative examples of heat stabilizers include antioxidants such as presented in *McCutch-*

*eon's Functional Materials*, edited by J. W. McCutcheon, published in 1980 by John W. McCutcheon, Inc., Morristown, N.J. Advantageously, the heat stabilizers employed herein are soluble in the mixture of the cellulosic and oil extender. Illustrative of such heat stabilizer include the phosphite esters such as the triarylphosphites (e.g., tri(nonylphenyl)phosphite), trialkylphosphites (e.g., triisooctyl phosphite and tris-(2-ethylhexyl)-phosphite), and the alkaryl phosphites (e.g., tris-(4-ethylphenol)phosphite); alkylarylamines such as N,N'-diphenylethylenediamine; alkylated phenols such as butylated octylphenol and 2,6-di-t-butyl-4-methylphenol; and the like. Although the antioxidant most advantageously employed herein is dependent on the cellulosic, oil extender and surfactant employed, the trialkylphosphites, particularly those having an alkyl group having at least about 6 carbon atoms and the alkaryl phosphites are generally preferred, with the trialkyl phosphites, particularly triisooctyl phosphite, being more preferred.

In the practice of this invention, the heat stabilizer is employed in an amount sufficient to measurably reduce the discoloration of the hot melt composition. By the term "measurably reduce the discoloration" is meant that a hot melt composition containing the heat stabilizer exhibits measurably less discoloration than an identical hot melt composition containing no heat stabilizer when said compositions are heated for extended periods, e.g., at least 2 hours at an elevated temperature sufficient to form a liquid composition. Preferably, such reduced discoloration is experienced when said compositions are heated for about 50 hours, more preferably for about 160 hours. The amount of heat stabilizer employed to obtain such desired reductions in discoloration is dependent on a variety of factors including the cellulosic, oil extender and surfactant employed. Typically, the heat stabilizer is employed in an amount from about 0.1 to about 20, preferably from about 0.25 to about 5, weight percent based on the weight of the cellulosic and oil extender.

In preparing the compositions of this invention, the surfactant and heat stabilizer are blended, i.e., surfactant and heat stabilizer become solubilized, in the cellulosic and oil extender mixture. In one operation, the hot melt composition is prepared by conventional techniques, with the surfactant, heat stabilizer and other adjuncts being blended with the molten composition. For example, the oil extender, cellulosic, surfactant, heat stabilizer and other adjuncts may be admixed and heated with agitation to a temperature at which solution occurs, e.g., 100°–225° C. Alternatively, a solidified hot melt composition may be reheated to a molten composition and the surfactant and heat stabilizer subsequently added thereto. Advantageously, the oil extender, including various adjuncts, is heated with agitation, to such molten temperatures and a mixture of the cellulosic and a compatibilizing amount of surfactant added thereto in a batchwise, intermittent or continuous manner, with continuous or intermittent addition being preferred. Beneficially, the agitation provided to said mixture is of a type and amount which minimizes the introduction of air into the liquefied mixture while providing rapid solution formation.

As mentioned, hot melt compositions are conventionally formulated with some amounts of heat stabilizer. However, additional amounts of a heat stabilizer are normally required to give the desired reduction in discoloration when a surfactant is incorporated within the composition. Such additional amounts of discoloration are normally dependent on the type and amounts of ingredients, particularly the surfactant, employed in the hot melt composition and are advantageously added with a mixture of the cellulosic and surfactant. In general, the cellulosic mixture containing the additional heat stabilizer will generally comprise from about 60 to about 99, preferably from about 70 to about 98, weight percent cellulosic; from about 0.5 to about 35, preferably from about 1 to about 15, weight percent surfactant and from about 0.5 to about 10, preferably from about 0.5 to about 5, weight percent heat stabilizer, wherein said weight percents are based on the total weight of the cellulosic, surfactant and heat stabilizer. Most preferably, said mixture comprises from about 90 to about 98 weight percent cellulosic, from about 1 to about 5 weight percent surfactant and from about 1 to about 5 weight percent heat stabilizer. The cellulosic is advantageously prepared in a manner such that the cellulosic surfactant and heat stabilizer form a uniform mixture. Typically, if the ingredients are solids, the cellulosic surfactant and heat stabilizer are dry blended to obtain the cellulosic mixture. Alternatively, if a cellulosic ingredient is in the form of a liquid such as various phosphite ester heat stabilizers, it is advantageously sprayed on a dry blend of the cellulosic and surfactant.

The resulting molten hot melt composition may be used as prepared or solidified by cooling. In the latter case, the solidified hot melt compositions are normally heated to a molten composition prior to use in coating applications.

The following examples are set forth to illustrate the advantages of the hot melt compositions of this invention and should not be construed to limit its scope. In the examples, all parts and percentages are by weight unless otherwise indicated.

EXAMPLE 1

To a 10 l. melting pot equipped with a thermocouple, heating and cooling device, agitator and thermometer is added the following ingredients:

| Ingredient | Parts |
| --- | --- |
| White Mineral Oil | 1,855 |
| Castor Oil | 183 |
| Epoxidized Soybean Oil | 61 |
| Styrene Based Plasticizer (1) | 176 |
| Triaryl Phosphite Heat Stabilizer (2) | 15 |

(1) Sold as 276 V9 Dow Resin by The Dow Chemical Company
(2) Sold as Advastab CH-201 by Cincinnati Milacron Chems., Inc.

While mildly agitating these ingredients, the melting pot is heated to about 120° C. and maintained at that temperature for a period of about 5 minutes. At this time, a cellulosic mixture comprised of 687 parts of ethyl cellulose having 49.3 percent ethoxy by weight and a viscosity, as a 5 weight percent solution in an 80/20 by volume toluene/ethanol mixture, of 50 cps as measured by an Ubbelhode viscometer (1.1 mm inside diameter) at 25° C. (sold as Ethocel ® by The Dow Chemical Company), 23 parts ditertiary butyl paracresol and 30 parts of a polyoxyethylene sorbitan monolaurate (sold as Tween ® 20 by ICI America) is continuously added to the melting pot for a 10 minute period. Following this addition, the temperature of the melting pot is increased to about 140° C. and maintained at that temperature for about 3 hours. The resulting solution is a hot melt composition and is designated Sample No. 1.

A portion of this solution is tested for oil exudation. The results of this testing are presented in Table I.

Similar hot melt compositions (Sample Nos. 2-7) are prepared in a similar manner using various surfactants as identified in Table I. A hot melt composition (Sample No. C) is prepared in a similar manner except no surfactant is incorporated in the composition. Each of these samples is also tested for oil exudation, with the results being recorded in Table I.

| Ingredient | Parts |
| --- | --- |
| White Mineral Oil | 925 |
| AA Castor Oil | 782 |
| Epoxidized Soybean Oil | 18 |
| Wax | 10 |
| Triaryl Phosphite Heat Stabilizer (1) | 5 |
| Butylated Hydroxy Toluene | 5 |
| Cellulose Acetate Butyrate | 825 |

TABLE I

| Sample No. | C* | 1 | 2 | 3 | 4 | 5*(4) | 6*(4) | 7* |
| --- | --- | --- | --- | --- | --- | --- | --- | --- |
| Surfactant (1) | — | Tween® 20 | Igepal® CO-990 | Pluronic® F68 | Pluronic® F77 | Span® 85 Tween® 61 | Span® 85 Tween® 20 | SLS |
| Oil Exudation (2) % | 2.9 | 0.5 | 0.5 | 0.03 | 0.1 | 5.0 | 2.9 | Extreme Degradation |
| Compatibility (3) | Poor | Good | Excellent | Excellent | Excellent | Poor | Poor | |

*Not examples of this invention
(1) Tween® 20 — polyoxyethylene sorbitan monolaurate sold by ICI America
Igepal® CO-990 — nonylphenoxypoly(ethyleneoxy)ethanol sold by GAF Corporation
Pluronic® F68 — a polyoxyalkylene derivative of propylene glycol sold by BASF Wyandotte
Pluronic® F77 — a polyoxyalkylene derivative of propylene glycol sold by BASF Wyandotte
Span® 85 — sorbitan trioleate sold by ICI America
Tween® 61 — polyoxyethylene sorbitan monostearate sold by ICI America
SLS — sodium lauryl sulfate
(2) Oil exudation is tested by pouring a portion of the hot melt composition, as prepared, from the melting pot into a Pyrex® measuring cup. The cup is placed in a hot air oven at 50° C. for 24 hours. Following this period, the cup is cooled to ambient temperatures, e.g., about 22° C. The cup, solidified hot melt composition and exuded oil is weighed to the nearest 0.1 g. The solidified composition is removed from the cup. This material is dried with absorbent toweling and weighed to the nearest 0.1 g. The measuring cup is washed free of oil using an 80/20 by volume toluene/alcohol solution. It is then dried and weighed to the nearest 0.1 g. Oil exudation as a percentage of the weight of solidified composition is determined using the following formula:

$$\frac{(T_w - C_w) - DC_w}{DC_w}$$

wherein $T_w$ is the combined weight of the cup, solidified composition and exudated oil, $C_w$ is the weight of the measuring cup and $DC_w$ is the weight of the solidified composition. Extreme degradation indicates the surfactant causes extreme degradation in the hot melt composition as evidenced by viscosity reduction and color formulation.
(3) Compatibility is tested by pouring a portion of the hot melt composition, as prepared, from the melting pot into a suitable container such that upon solidification a block of the composition is formed having dimensions of about 24 cm by 8 cm by 8 cm. This container is placed in a hot air oven at 50° C. for 24 hours. Following this period, the cup is cooled to ambient temperatures, e.g., about 22° C. The solidified composition is removed from the container and then cut with a knife to give 16 pieces having dimensions of 2 cm by 8 cm by 8 cm. Each piece is visually inspected with no magnification and rated. A composite rating, based on these individual ratings is determined. The ratings in Table I are such composite ratings, wherein "excellent" indicates essentially no incompatibility, "good" indicated some minor crazing, swirling and voids and "poor" indicates poor incompatibility as evidenced by excessive crazing, swirling and the like.
(4) Thirty parts of each listed surfactant are added to the hot melt composition in these samples.

As evidenced by the data in the foregoing Table, the presence of a compatibilizing amount of surfactant greatly reduces oil exudation and the incompatibility of the components in the hot melt composition.

Alternatively, the presence of sodium lauryl sulfate causes extreme degradation of the hot melt composition. This is believed to be due to the highly anionic character of said surfactant. The presence of Span® 85 in the hot melt composition does not reduce oil exudation or incompatibility. This is believed to be due to the relatively low HLB of said surfactant (HLB=1.8).

EXAMPLE 2

A hot melt composition is prepared which is similar in all respects to the hot melt composition of Example 1 except that the cellulosic mixture comprises 3 parts of sodium stearate per 100 parts of ethyl cellulose as the surfactant and about 2 parts of a trialkyl phosphite heat stabilizer per 100 parts of ethyl cellulose. This hot melt composition is found to exhibit about 0.3 percent oil exudation by the method described by Footnote 2 of Table I. By the method of Footnote 3 in Table I, its compatibility is found to be excellent.

As evidenced by this example, weak anionic surfactants, when employed in a compatibilizing amount, are shown to reduce oil exudation and increase compatibility of the components in a hot melt composition.

EXAMPLE 3

A 2500 part portion of a hot melt composition in a solidified condition having the following ingredients:

(1) Sold as Advastab CH-201 by Cincinnati Milacron Chems., Inc.

is mixed with a blend comprising 462.5 parts of white mineral oil, 335 parts of castor oil and 33 parts of Pluronic® F38, a polyoxyalkylene derivative of propylene glycol sold by BASF Wyandotte. This mixture is placed in a melting pot similar to the melting pot used in Example 1. The melting pot is heated to about 180° C. and maintained at that temperature until the solidified composition is completely melted. At this time, the ingredients in the melting pot are mildly agitated for a 30 minute period, while maintaining the temperature at about 180° C. The resulting solution is a hot melt composition. On cooling, the solidified composition shows about 0.5 percent oil exudation by the test methods of Example 1; see Footnote 2 of Table I therein.

A similar hot melt composition is prepared in a like manner except no surfactant, i.e., Pluronic® F38, is included in the composition. The hot melt composition shows 3 percent oil exudation and extensive incompatibility as evidenced by the large amount of crazing therein.

EXAMPLE 4

A hot melt composition having the following ingredients:

| Ingredient | Parts |
| --- | --- |
| White Mineral Oil | 607 |
| Castor Oil | 60 |

-continued

| Ingredient | Parts |
| --- | --- |
| Epoxidized Soybean Oil | 20 |
| Styrene Based Plasticizer | 58 |
| Triaryl Phosphite Heat Stabilizer | 5 |
| Ethyl Cellulose | 250 |
| Cellulose Acetate Butyrate | 250 |
| Pluronic ® F38 (1) | 40 |
| Dioctyl Phthalate | 10 |
| Ditertiary Butyl Paracresol | 50 |

(1) A polyoxyalkylene derivative of propylene glycol sold by BASF Wyandotte.

is prepared.

This mixture is placed in a melting pot similar to the melting pot employed in Example 1 and heated with agitation to about 170° C. After about 25 minutes at this temperature, a homogeneous liquid solution results. On cooling, the solidified composition is generally compatible, exhibiting only minimal crazing or swirling.

A similar hot melt composition having no surfactant therein exhibits excessive incompatibility between the ethyl cellulose and cellulose acetate butyrate.

Upon testing for oil exudation, it is found that the hot melt composition containing the surfactant (Pluronic ® F38) exudes lesser amounts of the oil extender than the hot melt composition containing no surfactant.

What is claimed is:

1. A hot melt composition comprising a cellulose ether or cellulose ester, an oil extender, an amount of a surfactant sufficient to measurably reduce the oil exudation from a solidified composition of the cellulosic and oil extender or visually improve the compatibility of the components in the solidified composition and an amount of a heat stabilizer sufficient to reduce the discoloration of the hot melt composition upon extended heating at a temperature sufficient to form a liquid solution of the hot melt composition.

2. The hot melt composition of claim 1 wherein the cellulosic is ethyl cellulose, cellulose acetate butyrate, cellulose nitrate, cellulose acetate propionate, cellulose acetate or ethyl hydroxyethyl cellulose and the oil extender is a mineral oil, vegetable oil, animal oil or mixed glyceride.

3. The hot melt composition of claim 1 wherein the surfactant is a surfactant having an HLB value of at least 6 which is soluble in a mixture of the cellulosic and oil extender.

4. The hot melt composition of claim 1 wherein the surfactant is a polyoxyethylene derivative of fatty acid partial esters of sorbitol anhydrides, an ethoxylated sorbitan ester, an alkylphenoxypoly(oxyethylene)ethanol, a polyoxyalkylene derivative of propylene glycol or a sorbitan carboxylate.

5. The hot melt composition of claim 1 wherein the surfactant is a metal salt of a carboxylic acid having 6 or more carbon atoms.

6. The hot melt composition of claim 5 wherein the alkali metal salt of a carboxylic acid is a sodium salt of stearic acid.

7. The hot melt composition of claim 1 wherein the heat stabilizer is a phosphite ester, an alkylaryl amine or an alkylated phenol.

8. The hot melt composition of claim 7 wherein the heat stabilizer is a triaryl phosphite or alkaryl phosphite.

9. The hot melt composition of claim 7 wherein the heat stabilizer comprises from about 0.1 to about 20 weight percent of the composition based on the weight of the cellulosic and oil extender.

10. The hot melt composition of claim 9 wherein the surfactant comprises from about 0.5 to about 5 weight percent of the composition based on the weight of the cellulosic and oil extender.

11. The hot melt composition of claim 10 wherein the cellulosic is ethyl cellulose or cellulose acetate butyrate and comprises from about 10 to about 50 weight percent of the composition and the oil extender comprises from about 90 to about 50 weight percent of the composition, said weight percents being based on the total weight of the cellulosic and oil extender.

12. The hot melt composition of claim 11 wherein the composition comprises from about 20 to about 40 weight percent cellulosic, from about 80 to about 60 weight percent oil extender and from about 0.5 to about 2 weight percent of surfactant and from about 0.25 to about 5 weight percent of the heat stabilizer wherein the weight percents are based on the total weight of the cellulosic and oil extender.

13. A cellulosic composition comprising from about 60 to about 99 weight percent of a cellulose ether or cellulose ester from about 0.5 to about 35 weight percent of a surfactant and from about 0.5 to about 10 weight percent of a heat stabilizer, said weight percents being based on the total weight of cellulosic, surfactant and heat stabilizer.

14. The cellulosic composition of claim 13 wherein the antioxidant is a trialkyl phosphite or an alkaryl phosphite.

15. The cellulosic composition of claim 13 wherein the heat stabilizer is a trialkyl phosphite.

16. The cellulosic composition of claim 13 wherein the cellulosic is ethyl cellulose, cellulose acetate butyrate, cellulose nitrate, cellulose acetate propionate, cellulose acetate or ethyl hydroxyethyl cellulose.

17. The cellulosic composition of claim 13 wherein the surfactant has an HLB value of at least about 6.

18. The cellulosic composition of claim 13 wherein the surfactant is a polyoxyethylene derivative of fatty acid partial esters of sorbitol anhydrides, an ethoxylated sorbitan ester, an alkylphenoxypoly(oxyethylene)ethanol, a polyoxyalkylene derivative of propylene glycol or a sorbitan carboxylate.

19. The cellulosic composition of claim 13 wherein the surfactant is a metal salt of a carboxylic acid having 6 or more carbon atoms.

20. The cellulosic composition of claim 18 wherein the alkali metal salt of a carboxylic acid is a sodium salt of stearic acid.

21. The cellulosic composition of claim 13 wherein the cellulosic is ethyl cellulose or cellulose acetate butyrate, the surfactant is a carboxylic acid having 6 or more carbon atoms, the heat stabilizer is a trialkyl phosphite and the cellulosic comprises from about 90 to about 98 weight percent, the surfactant comprises from about 1 to about 5 weight percent and the heat stabilizer comprises from about 1 to about 5 weight percent of the cellulosic composition, said weight percents being based on the total weight of cellulosic, surfactant and heat stabilizer.

* * * * *